June 12, 1923.    1,458,806

E. L. P. COLARDEAU

ELECTRIC GENERATING GROUP

Filed Oct. 22, 1918

Inventor:
Emmanuel Louis Paul Colardeau

Patented June 12, 1923.

1,458,806

UNITED STATES PATENT OFFICE.

EMMANUEL LOUIS PAUL COLARDEAU, OF PARIS, FRANCE, ASSIGNOR TO HENRY CROCHAT, OF PARIS, FRANCE.

ELECTRIC GENERATING GROUP.

Application filed October 22, 1918. Serial No. 259,220.

*To all whom it may concern:*

Be it known that I, EMMANUEL LOUIS PAUL COLARDEAU, citizen of the French Republic, residing at Paris, France, have invented certain new and useful Improvements in Electric Generating Groups, of which the following is a specification.

This invention relates to the arrangement of several electric generating groups or sets for the purpose of supplying an equal number of electric motor groups of the kind used for driving a locomotive or an electric motor car. The invention relates more particularly, but not exclusively, to the arrangement of generating groups comprising shunt dynamos, in which, in order to ensure the starting of electric series motors which they supply and which are always connected to the dynamo terminals, the said shunt dynamos are when started, temporarily converted into compound dynamos, and they are restored to their normal condition as shunt dynamos when the starting period is over. During the normal function of these dynamos as shunt dynamos, the speed of the electric motors fed by these dynamos is controlled by varying the voltage of the dynamos, the voltage being varied at will by modifying the speed of the dynamos.

The invention has for its chief object to enable the generating groups to be so arranged that all the groups work in identical conditions principally at starting. This arrangement is of special importance when it is desired to supply a corresponding group of motors by each of the generating groups.

The invention consists, chiefly also, in so arranging the series field windings of the dynamos comprised in the generating sets, that the current generated by the dynamo of one of the groups is able to pass through at least a part of the series field winding of the dynamos of the other groups, so as to equalize constantly the magnetizing currents in the series field windings of these two dynamos.

Figure 1:
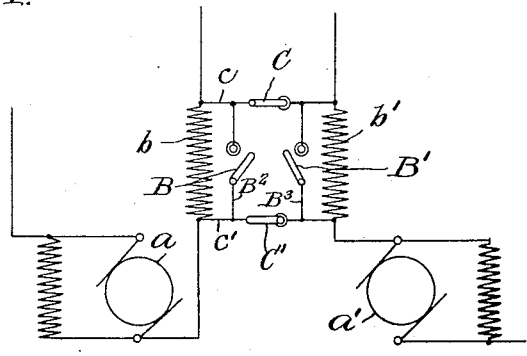
Figure 2:
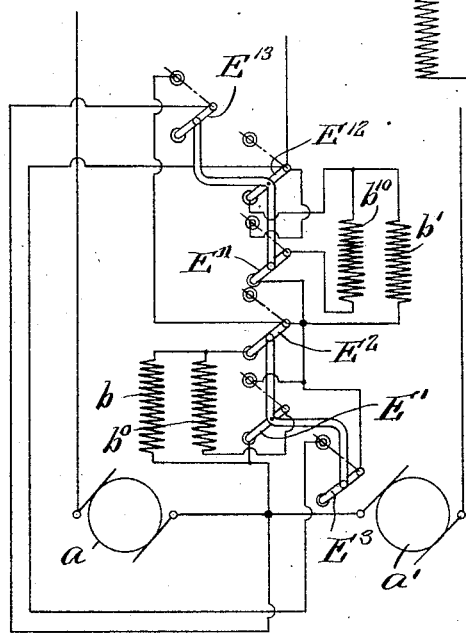
Figure 3:
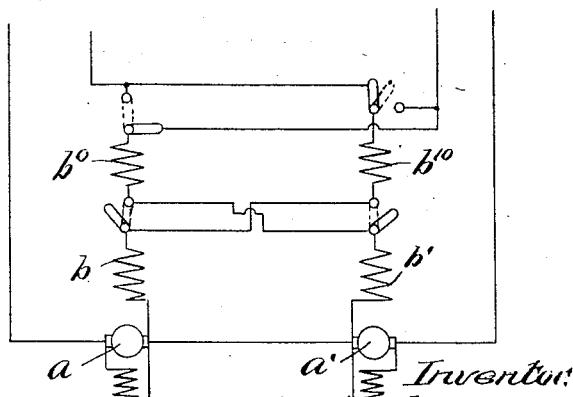

In the accompanying drawing,

Figures 1–3 show three connection diagrams of dynamos of two generating groups, in accordance with three methods of carrying out the invention.

Two generating groups are provided each comprising a shunt dynamo $a$, $a^1$ arranged so that it can be converted, at the beginning of its excitation, into a compound dynamo, and each group supplies a group of motors (not shown in the drawing). When it is desired to equalize, during the starting period, the magnetizing field currents of the said two dynamos, the proceeding is as follows: Each of the said dynamos is provided with a series field winding which can be switched in different ways (Figs. 1, 2 and 3) into its appropriate dynamo-circuit. Between the two dynamos $a$, $a^1$, connections are made so that the current generated by one of the dynamos can pass through at least a part of the series field winding $b^1$ or $b$ of the other dynamo. Thus as shown in Figure 1 the ends of the series field windings of the two dynamos are connected together by balance wires $c$, $c^1$ which equalize the currents of the said two windings. If care is taken to make these two windings $b$ and $b^1$ of suitable resistance and number of turns, (if, for instance, the dynamo $a$ is slow to start), its series field winding $b$ will be traversed by the same current as the series field winding of the dynamo $a^1$, and the two dynamos will be consequently forced to work in an identical manner. This arrangement renders it possible in a simple manner to use, when desired, only one generating group, since it is sufficient to open the switches C, C$^1$ inserted in the balance wires $c$, $c^1$. When the starting period is over, the series field winding can in any case be rendered inoperative by closing one or both of the switches B or B$^1$ arranged in the short circuit wires B$^2$, B$^3$.

In the arrangement shown in Figure 2, the balance wires $c$, $c^1$ are dispensed with and the series windings $b$ and $b^1$ are connected in series, and the current produced by the two dynamos $a$ and $a^1$ constantly passes through the field windings $b$ and $b^1$. This arrangement necessitates division of each of the field windings into two identical elements or parts $b$, $b^0$ and $b^1$, $b^{10}$, (in order to enable only one generating group to be used when desired), and the use of means such for instance as the connected switches E$^1$, E$^2$, E$^3$ and E$^{11}$, E$^{12}$ and E$^{13}$, respectively to make it possible by operation of the switches E$^1$, E$^2$ and E$^{11}$ and E$^{12}$, respectively, to connect normally the two elements of one or the other field winding in parallel (as represented in Fig. 2), and to connect the elements of either one of these two windings in series by means of the same switches E, E$^3$ or E$^{11}$, E$^{12}$ when only one generating group is to be used so as then to double their number of turns and to compensate for the decrease of strength due to the fact that one of the dynamos is out of action and no longer sends current into the field magnets. The field magnet windings of the dynamo out of action are short circuited by operation of the switches $E^3$ and $E^{13}$, respectively, this short circuiting operation being caused, according to the arrangement shown in Figure 2, by moving upwardly the connected switches $E^1$, $E^2$, $E^3$ and $E^{11}$, $E^{12}$ and $E^{13}$, respectively.

In the arrangement shown in Figure 3, the field windings of each dynamo are divided into two identical elements $b$, $b^0$ and $b^1$, $b^{10}$, and one of the said elements $b$, $b^1$ is switched into the circuit of the corresponding dynamo, and the other element $b^0$, $b^{10}$ into the circuit of the other dynamo. In this arrangement, the same results can be obtained as in the two preceding arrangements, and it will be sufficient, when it is desired to use only one generating group, to change the connections of the series field element which was switched into the circuit of the dynamo of the other group, in order to switch the said element into the circuit of the dynamo which corresponds to it, in the manner indicated in dotted lines in Fig. 3 which show the positions of the switches when the dynamo $a$ is operating alone.

I claim as my invention:—

1. An electric installation comprising a plurality of shunt dynamos constituting a dynamo system, said dynamos being capable of running at different speeds and of stopping individually, an auxiliary series field winding system for starting purposes associated with said dynamo system, said field winding system comprising auxiliary field winding elements so arranged that the current of each dynamo passes, during the starting period, through at least a part of the field winding elements of all the other dynamos of the dynamo system, said auxiliary winding elements being all of cumulative effect with respect to the shunt field of each dynamo, and means to cut out said auxiliary field winding elements when the starting period of the dynamo system is over, said means being also capable of switching said auxiliary winding elements for starting action when a part of the dynamo system is out of action.

2. An electric installation comprising a dynamo system embodying two shunt dynamos having one of their poles in common and independent circuits fed by the other poles of said dynamos, said dynamos being capable of running at different relative speeds and of stopping individually, an auxiliary series field winding system for starting purposes associated with the dynamo system, said field winding system comprising auxiliary winding elements so arranged that at least a part of the current generated in one dynamo flows, during the starting period, through at least a part of the auxiliary winding elements of the other dynamo, said auxiliary winding elements being all of cumulative effect with respect to the shunt field of each dynamo, and means to cut out said auxiliary winding elements when the starting period is over, said means being also capable of switching said auxiliary winding elements for starting action when one of the two dynamos is out of action.

In testimony whereof I have hereunto set my hand in presence of two subscribing witnesses.

EMMANUEL LOUIS PAUL COLARDEAU.

Witnesses:
 EUGENÈ JULIUS,
 JOHN F. SIMONS.